(12) United States Patent
Poveda

(10) Patent No.: US 12,039,216 B2
(45) Date of Patent: Jul. 16, 2024

(54) MULTIFUNCTION DISPLAY SYSTEM FOR AN AIRCRAFT, ASSOCIATED AIRCRAFT AND DISPLAY METHOD

(71) Applicant: AIRBUS HELICOPTERS, Marignane (FR)

(72) Inventor: Stephane Poveda, Lambesc (FR)

(73) Assignee: AIRBUS HELICOPTERS, Marignane (FR)

( * ) Notice: Subject to any disclaimer, the term of this patent is extended or adjusted under 35 U.S.C. 154(b) by 4 days.

(21) Appl. No.: 17/967,348

(22) Filed: Oct. 17, 2022

(65) Prior Publication Data

US 2023/0161536 A1    May 25, 2023

(30) Foreign Application Priority Data

Nov. 22, 2021  (FR) ...................... 2112308

(51) Int. Cl.
  *G06F 3/14*  (2006.01)
  *B64D 45/00*  (2006.01)
  *G09G 5/00*  (2006.01)
  *G09G 5/12*  (2006.01)
(52) U.S. Cl.
  CPC ........... *G06F 3/1446* (2013.01); *B64D 45/00* (2013.01); *B64D 2045/0085* (2013.01)
(58) Field of Classification Search
  None
  See application file for complete search history.

(56) References Cited

U.S. PATENT DOCUMENTS

| 6,842,672 | B1 | 1/2005 | Straub et al. | |
| 6,985,801 | B1 | 1/2006 | Straub et al. | |
| 2008/0246633 | A1* | 10/2008 | Pouzolz | G01D 3/10 |
| | | | | 340/971 |
| 2013/0076540 | A1 | 3/2013 | McLoughlin et al. | |
| 2018/0357030 | A1* | 12/2018 | Fairchild | G09G 5/12 |

FOREIGN PATENT DOCUMENTS

| EP | 3686732 A1 | 7/2020 |
| FR | 2892092 A1 | 4/2007 |

OTHER PUBLICATIONS

Walkthrough of the Helionix Avionics System in the Airbus Helicopters H135 Twin AINtv. Uploaded by: Aviation International News. Mar. 21, 2017. https://www.youtube.com/watch?v=a9ExJCnLDJw.

French Search Report for French Application No. FR2112308, Completed by the French Patent Office, Dated Jul. 15, 2022, 9 pages.

* cited by examiner

*Primary Examiner* — Carl Adams
(74) *Attorney, Agent, or Firm* — Brooks Kushman P.C.

(57) ABSTRACT

A two-pilot multifunction display system and an aircraft equipped with the system, the system comprising: at least three screens, at least two of the at least three screens being suitable for displaying a page of symbologies referred to as the "FND page" comprising predetermined symbols and information relating to the flight and to the navigation of the aircraft; and detectors for detecting at least one failed screen among the at least three screens.

14 Claims, 3 Drawing Sheets

MULTIFUNCTION DISPLAY SYSTEM FOR AN AIRCRAFT, ASSOCIATED AIRCRAFT AND DISPLAY METHOD

CROSS REFERENCE TO RELATED APPLICATIONS

This application claims priority to French patent application No. FR 2112308 filed on Nov. 22, 2021, the disclosure of which is incorporated in its entirety by reference herein.

TECHNICAL FIELD

The present disclosure relates to the field of the multifunction display of an aircraft with a crew of at least two pilots. Such an aircraft may in particular be an airplane or a rotorcraft such as, for example, a helicopter comprising at least one lift rotor, and also at least one propeller for assisting propulsion.

BACKGROUND

The aircraft may provide the two pilots with the same flight controls or indeed separate controls. One of the pilots may control the flight of the aircraft using his or her controls and the other pilot may have the role of copilot. The roles of the pilot and copilot may moreover be switched during flight when the aircraft is on a mission.

Either of the two pilots may be referred to indiscriminately hereinafter as the pilot and copilot of the aircraft and, in order to facilitate understanding of the application, they shall be referred to hereinafter as the first pilot and second pilot.

Moreover, a display system embedded in the aircraft is used to communicate various data to the two pilots. This data may comprise flight and navigation assistance data, for example for helping control the flight of the aircraft and, in particular, for enabling the pilots to follow a heading, keep the aircraft at a predetermined altitude, etc.

Such a display system comprises a plurality of screens and, for example, at least four screens, at least three of which may be arranged on an instrument panel, in order to simultaneously display several pages of symbologies useful for controlling the flight of this aircraft.

For example, the pages generally displayed on the screens may be chosen by each pilot depending on the preferences of the pilot or his or her needs in order to control the flight of the aircraft or, in the case of the copilot, in order to help the pilot.

These pages may, in particular, comprise a page referred to as "FND", standing for "Flight Navigation Display", a page referred to as "ND", standing for "Navigation Display", a page referred to as "VMS", standing for "Vehicle Management System", a page referred to as "DMAP", standing for "Digital MAP", and a "MISSION" page.

Such a Flight Navigation Display page comprises symbols and information representative, for example, of a heading and an altitude.

Unlike the Navigation Display page, the Flight Navigation Display page displays all the primary information useful for controlling flight, such as the attitude of the aircraft, the speed of the aircraft, the sideslip of the aircraft, the height of the aircraft and the driving power, and for navigation, such as a flight plan. In a nominal operating mode, such a page in FND format may be displayed in front of the pilot at the controls of the aircraft.

Such an FND page is, in particular, known and used in display systems for aircraft equipped with the Helionix® avionics suite. One example of such an FND page is also described in greater detail in a presentation video titled "Walkthrough of the Helionix Avionics System in the Airbus Helicopters H135 Twin•AINtv", which can be viewed, for example, at the following website: https://www.youtube.com/watch?v=a9ExJCnLDJw.

Moreover, the FND page differs from a PFD page, standing for "Primary Flight Display", or from an MFD page, standing for "Multifunction Flight Display", wherein it comprises information useful for navigation, such as a flight plan.

Similarly, an FND page differs from an ND page wherein it comprises information useful for controlling flight, such as the attitude of the aircraft, the speed of the aircraft, the sideslip of the aircraft, the height of the aircraft, and the driving power.

Moreover, document FR 2 892 092 discloses a display system comprising automatic reconfiguration means which, upon detection of a failure of a screen of the system, displays the image that is associated with the failed screen on a valid screen whose associated image has lower priority according to priority rules.

This document describes, in particular, the display of Navigation Display pages on the screens of the system.

Document U.S. Pat. No. 6,842,672 relates to cockpit instrument panel systems and methods for presenting data on cockpit instruments. In particular, this document relates to redundant flight data display methods.

Such an instrument panel has two screens with a backup display mode for displaying information essential for controlling flight on a screen in the event of the other screen failing.

Document EP 3 686 732 relates to the reconfiguration of a display system in single-pilot mode.

Document US20130076540A1 describes a multi-product avionics control and display unit or CDU. This CDU may, for example, comprise three screens: two primary screens (102(1), 102(2)), "Primary Flight Displays" (PFD), and a multifunction central screen (104), "Multifunction Flight Display" (MFD).

It also describes that the PFD pages may be displayed on the PFD screen 102(1), on the PFD screen 102(2), or indeed on the MFD screen 104 if the primary flight information received from the AHRS 110 and the ADC 112 is incorrect or unavailable.

Reversible switches 118 may be selected manually by the pilot to configure the PFD screens 102 or the MFD screen 104 to display the PFD pages from either the first AHRS 110(1) and ADC 112(1) or the second AHRS 110(2) and ADC(2). One or both of the PFD screens 102 may also be configured to display information displayed on the MFD screen 104, such as engine gauges and navigation information, for example in the event of failure of the MFD screen 104.

Document U.S. Pat. No. 6,985,801B1 relates to systems and methods for a cockpit instrument panel with a redundant flight data display. Therefore, these systems comprise at least two multifunction screens (MFD) 420, 460.

Furthermore, when one of the MFD screens (420 or 460) fails, the MFD screen that remains in operation (420 or 460) is automatically adapted or adjusted to display all the flight information data, which was previously displayed on the two MFD screens.

SUMMARY

The object of the present disclosure is therefore to propose an alternative multifunction display system of an aircraft with two pilots, and an associated method.

The disclosure therefore relates to a two-pilot multifunction display system comprising:

at least three screens, for example arranged on an instrument panel of an aircraft, at least two of the at least three screens being suitable for displaying a page of symbologies referred to as the "FND page" comprising predetermined symbols and information relating to the flight and to the navigation of the aircraft; and detectors for detecting at least one failed screen among the at least three screens.

According to the disclosure, such a system is remarkable wherein, except in the event of failure of at least one of the at least three screens, the FND page is displayed at least on a priority screen of the at least three screens without a first pilot and a second pilot having the possibility of removing the FND page, and wherein the display system comprises a controller configured so that, in the event of failure of the priority screen detected by the detectors, the FND page is automatically displayed on a valid screen of the at least three screens without the first pilot and the second pilot having the possibility of removing the FND page from the valid screen.

In other words, such a display system allows the display of the FND page to be assigned to a priority screen. This FND page cannot be deleted by the crew from this screen considered to be the priority screen.

Optionally, the FND page may also be displayed on other screens considered to be secondary screens. In this case, an FND page displayed on a secondary screen may be removed by one of the pilots.

The detectors allow a failed screen to be detected in a conventional manner, for example by detecting a power supply problem of the priority screen, a computing capacity problem at a central processing unit (CPU), a graphic generation problem at a graphics processing unit (GPU), a problem of one or more pixels of this priority screen getting stuck or indeed the page displayed on this priority screen being frozen. Indeed, an FND page generally comprises a plurality of images displayed successively on a screen. The FND page freezing may therefore correspond to the displayed images getting stuck.

Conversely, a screen is considered to be valid if no anomaly is detected by the detectors.

Such detectors may in particular comprise sensors measuring at least one physical quantity such as an electrical voltage or an electric current and a processing unit for analyzing this physical quantity, or comparing it with at least one predetermined threshold value.

The processing unit of the detectors may, for example, comprise at least one processor and at least one memory, at least one integrated circuit, at least one programmable system, or at least one logic circuit, these examples not limiting the scope given to the expression "processing unit". The term "processor" may refer equally to a central processing unit (CPU), a graphics processing unit (GPU), a digital signal processor (DSP), a microcontroller, etc.

In the event of a failure detected on the priority screen displaying the FND page, the controller identifies a valid screen from the other screens and automatically switches the display of the FND page to this valid screen.

The display system therefore makes it possible to assign the display of the FND page to this valid screen with the same rules as on the priority screen. Indeed, the FND page cannot be deleted by the crew from this valid screen.

By way of example, the controller may comprise at least one processor and at least one memory, at least one integrated circuit, at least one programmable system, or at least one logic circuit, these examples not limiting the scope to be given to the term "controller". The term "processor" may refer equally to a central processing unit (CPU), a graphics processing unit (GPU), a digital signal processor (DSP), a microcontroller, etc.

Moreover, the screens may be connected to each other and/or connected individually with the detectors via wired or wireless links in order to transmit their valid or failed status to the detectors. In this case, each screen may comprise a sensor and a part of the processing unit of the detectors for analyzing the output signal of that sensor. In this way, the detectors may be arranged partially or totally in the screens in order to identify the valid or failed status of each screen.

The screens may also be connected individually with the controller by wired or wireless links in order to transmit the FND page to be displayed on a valid screen and the display rules prohibiting the pilots from removing this FND page.

Such a two-pilot multifunction display system is particularly suitable for aircraft comprising mechanical flight controls for controlling aerodynamic members, for example the pitch of blades of a rotor and/or flaps and/or rudders of a tail unit.

The multifunction display system is further advantageous because it helps reduce the workload of the crew by displaying the FND page at all times on a valid screen without the pilots taking any action. This improves the safety of the aircraft's mission.

Moreover, the two-pilot multifunction display system may comprise one or more of the following features.

Advantageously, the at least three screens comprising a right-hand screen arranged facing the first pilot, a left-hand screen arranged facing the second pilot and a central screen arranged between the first pilot and the second pilot, the first pilot and the second pilot being sat side by side in an aircraft cockpit, the priority screen may be chosen from the group comprising the left-hand screen and the right-hand screen.

Therefore, the priority screen is one of the screens arranged facing one of the pilots. The FND page is therefore perfectly visible to this pilot when the pilot is looking forwards.

According to a first variant of the disclosure, the priority screen may be the right-hand screen.

In this case, the right-hand screen initially displays the FND page, for example when the aircraft is taking off and as long as it does not fail. In the event of a failure detected on this right-hand screen during flight, the controller automatically switches the display of the FND page to a screen that remains valid such as the left-hand screen or the central screen.

Such a first variant is also implemented when the first pilot is preferably the pilot who is actually at the controls of the aircraft and the second pilot is preferably the copilot.

According to a second variant of the disclosure, the priority screen may be the left-hand screen.

In this case, the left-hand screen initially displays the FND page, for example when the aircraft is taking off and as long as it does not fail. In the event of a failure detected on this left-hand screen during flight, the controller automatically switches the display of the FND page to a screen that remains valid such as the right-hand screen or the central screen.

Such a second variant is implemented when the first pilot is preferably the copilot and the second pilot is preferably the pilot at the controls of the aircraft.

According to a first operating mode of the disclosure, except in the event of failure of at least one of the at least three screens, the system may be configured to display the FND page on the whole of the priority screen and, in the event of failure of the priority screen detected by the detectors, the controller may be configured to display the FND page on the whole of the valid screen.

In other words, the FND page may be displayed on the whole of the surface of the priority screen and then, in the event of failure, on the whole of the surface of the valid screen.

According to a second operating mode of the disclosure, except in the event of failure of at least one of the at least three screens, the system may be configured to display the FND page on a portion of the priority screen and, in the event of failure of the priority screen detected by the detectors, the controller may be configured to display the FND page on part of the valid screen.

In other words, according to another configuration of the system, the FND page may be displayed with at least one other page, each respectively on a portion of the surface of the priority screen and then, in the event of failure, only the FND page initially displayed on the priority screen may be displayed on a part of the surface of the valid screen.

The valid screen may then also display, on another part, a page initially displayed on this valid screen before the failure of the priority screen.

Advantageously, the portion of the priority screen and the part of the valid screen may be screen halves. Such a second operating mode therefore allows the pilots to keep the page initially displayed on the valid screen in addition to the newly displayed FND page.

According to a first embodiment of the second operating mode of the disclosure, the at least three screens comprising a right-hand screen arranged facing a first pilot, a left-hand screen arranged facing a second pilot and a central screen arranged between the first pilot and the second pilot, the first pilot and the second pilot being sat side by side in an aircraft cockpit, the priority screen being the right-hand screen, in the event of failure of the priority screen detected by the detectors, the controller may be configured to display the FND page on a right-hand part of the valid screen.

Therefore, the right-hand screen initially displays the FND page on a portion of its surface, for example when the aircraft is taking off. In the event of a failure detected on this right-hand screen during flight, the controller automatically switches the display of the FND page to a right-hand part of the surface of a screen that remains valid such as the left-hand screen or the central screen. This arrangement makes it easier for the first pilot positioned facing the right-hand screen to view the FND page.

According to a second embodiment of the second operating mode of the disclosure, the at least three screens comprising a right-hand screen arranged facing a first pilot, a left-hand screen arranged facing a second pilot and a central screen arranged between the first pilot and the second pilot, the first pilot and the second pilot being sat side by side in an aircraft cockpit, the priority screen being the left-hand screen, in the event of failure of the priority screen detected by the detectors, the controller may be configured to display the FND page on a left-hand part of the valid screen.

According to this example, the left-hand screen initially displays the FND page on a portion of its surface, for example when the aircraft is taking off. In the event of a failure detected on this left-hand screen during flight, the controller automatically switches the display of the FND page to a left-hand part of the surface of a screen that remains valid such as the right-hand screen or the central screen. This arrangement makes it easier for the second pilot positioned facing the left-hand screen to view the FND page.

Another object of the present disclosure is an aircraft comprising a cockpit suitable for receiving a first pilot and a second pilot sat side by side to either side of an anteroposterior plane of the aircraft.

Such an aircraft may preferably be a rotorcraft, a helicopter or a compound helicopter comprising, in particular, a wing contributing to lift and at least one pusher or tractor propeller.

According to the disclosure, such an aircraft is remarkable wherein it comprises a two-pilot multifunction display system as mentioned above.

In other words, the aircraft comprises detectors and a controller as previously described for automatically controlling the display of an FND page.

The object of the present disclosure is also a two-pilot multifunction display method of an aircraft comprising the steps of:
  generating a page of symbologies referred to as the "FND page" comprising predetermined symbols and information relating to the flight and to the navigation of the aircraft; and
  monitoring at least three screens in order to detect at least one failed screen among the at least three screens.

According to the disclosure, such a method is remarkable wherein, except in the event of failure of at least one of the at least three screens, the method comprises displaying the FND page on a priority screen of the at least three screens without a first pilot and a second pilot having the possibility of removing the FND page, and wherein, in the event of failure of the priority screen detected during the monitoring process, the method comprises an automatic reconfiguration with a controller in order to automatically display the FND page on a valid screen of the at least three screens without the first pilot and the second pilot having the possibility of removing the FND page from the valid screen.

In other words, the display of the FND page on the priority screen prohibits the deletion of this page by either of the two pilots.

The monitoring process is carried out by detectors as previously described which identify a failure of this priority screen and are also used to identify the screens that remain valid from the at least two other screens. Such a monitoring process therefore helps save time because there is then no need to identify the screens that remain valid during the automatic reconfiguration step.

The automatic reconfiguration makes it possible, by means of the previously described controller, to display this FND page on one of the screens that remains valid with the same display rules initially used on the priority screen, and more specifically with the pilots prohibited from removing this FND page from the valid screen.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

The disclosure therefore relates to a two-pilot multifunction display system comprising at least three screens. Such a display system may usually also comprise buttons and/or touch panels arranged in overlay on the screens.

Figure 1:
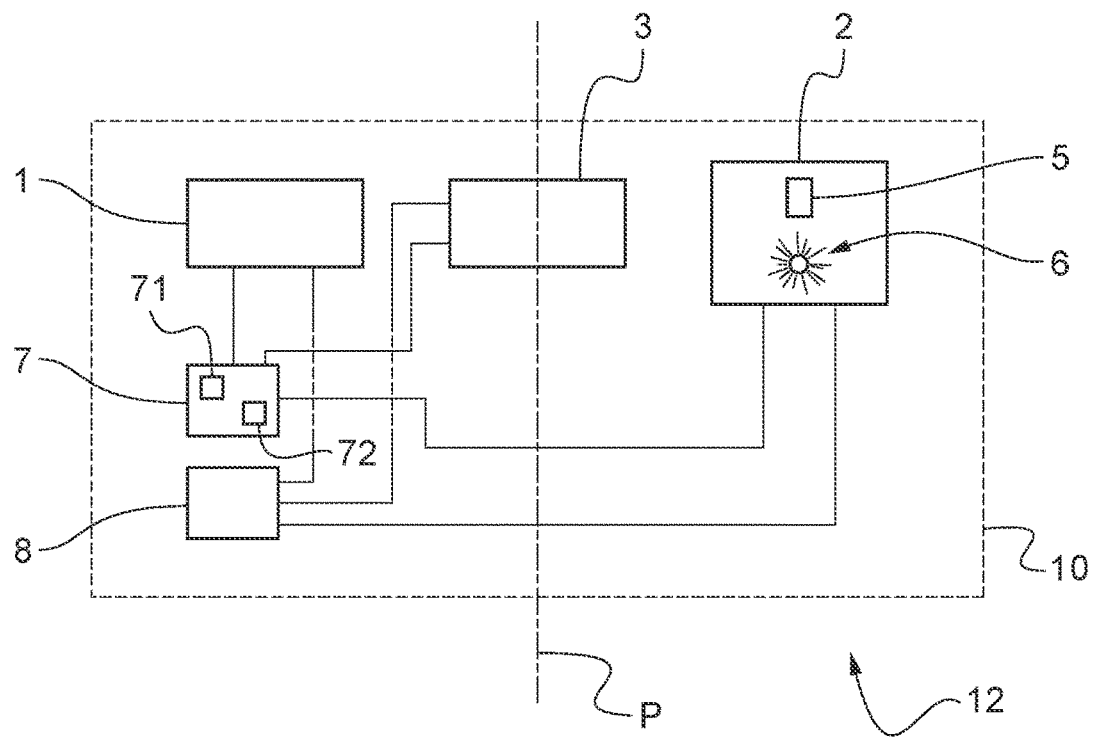
FIG. 1 is a diagram showing a two-pilot multifunction display system according to the disclosure.

As shown in FIG. 1, the system 10 therefore comprises a right-hand screen 2 arranged facing a first pilot when this first pilot is looking straight ahead in a direction lying in a median plane passing through the first pilot, a left-hand screen 1 arranged facing a second pilot when this second pilot is looking straight ahead in a direction lying in a median plane passing through the second pilot and a central screen 3 arranged between the first pilot and the second pilot.

Moreover, the first pilot and the second pilot are sat side by side in an aircraft cockpit 12 to either side of an anteroposterior plane P.

Figure 2:
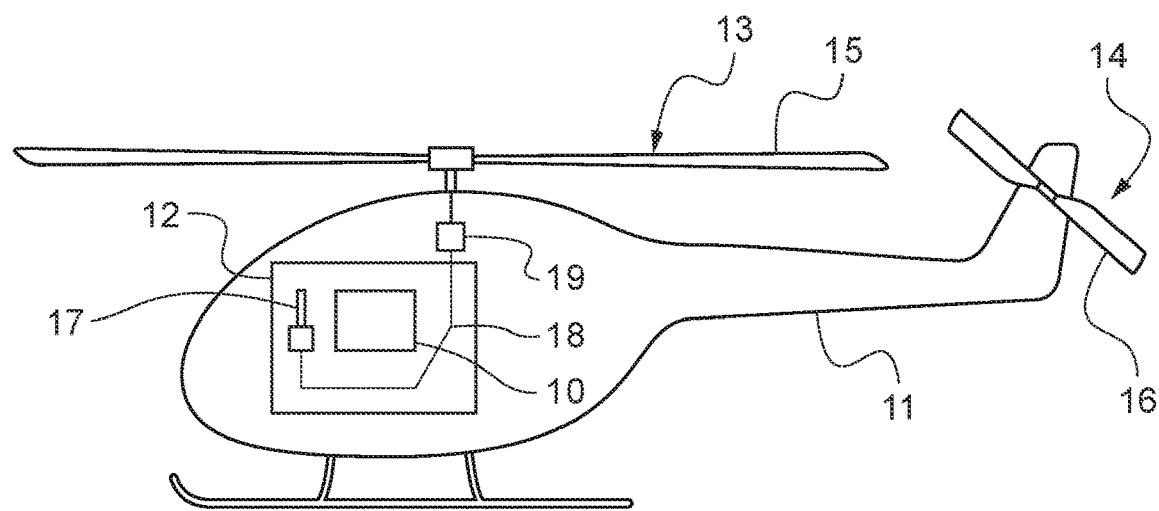
FIG. 2 is a side view of an aircraft according to the disclosure.

As shown in FIG. 2, the system 10 is arranged inside the cockpit 12 of an aircraft 11 such as a conventional helicopter comprising a lift rotor 13 and a rear rotor 14. The disclosure is not limited only to this type of aircraft 11, and may also apply to an airplane or indeed a compound helicopter provided with a wing contributing to lift and at least one propeller contributing to propulsion.

Such an aircraft 11 is advantageously a helicopter with mechanical flight controls or electric flight controls comprising at least one control member 17, such as a stick and/or a lever, maneuvered by a pilot, at least one mechanical or electrical connection 18 extending between the control member 17 and an actuator 19 for controlling the pitch of the blades 15 of the lift rotor 13. These flight controls may also comprise another control member, such as a rudder bar, another mechanical connection and another actuator allowing the pitch of the blades 16 of the rear rotor 14 to be modified.

The screens 1, 2, 3 are all suitable for displaying a page of symbologies referred to as the "FND page" comprising symbols 5, such as a dial, a ruler, a scale and/or reference marks, and predetermined information 6 such as an index moving on a dial or along a ruler, this information 6 being variable over time and representing a heading or altitude value relating to the flight and to the navigation of an aircraft.

Moreover, such a system 10 comprises detectors 7 for detecting that at least one of the screens 1, 2, 3 has failed.

Such detectors 7 are connected by wired or wireless means to each screen 1, 2, 3 in order to identify whether they have failed or are valid. Alternatively, and according to another variant not shown here, the detectors 7 may be partially or totally integrated into each screen 1, 2, 3.

These detectors 7 may in particular comprise sensors 71 measuring at least one physical quantity such as an electrical voltage or an electric current and a processing unit 72 for analyzing this physical quantity, or comparing it with at least one predetermined threshold value.

The right-hand screen 2 may be considered to be a priority screen when it displays the FND page without the pilots having the possibility of removing it. Such an arrangement is generally the case when the first pilot is preferably the pilot and the second pilot is preferably the copilot of the aircraft.

In the event of a failure detected on this right-hand screen 2, referred to as the priority screen, displaying the FND page, a controller 8 identifies a valid screen 1 from the other screens 1 and 3 and automatically switches the display of the FND page to this valid screen 1.

The display system 10 then makes it possible to assign the display of the FND page to this valid screen 1 without the crew having the possibility of deleting this FND page from this valid screen 1.

Moreover, the screens 1, 2, 3 may be connected to each other and are connected to the controller 8 by wired or wireless links in order to transmit their valid or failed status to the controller 8. In this case, each screen 1, 2, 3 may also comprise all or part of the sensors 71 and the processing unit 72 of the detectors 7.

Figure 3:
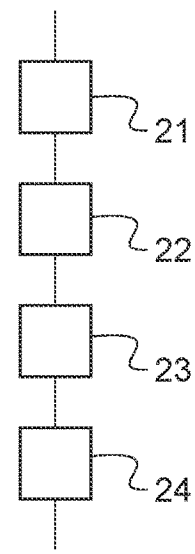
FIG. 3 is a logic diagram representing a two-pilot multifunction display method according to the disclosure.

As shown in FIG. 3, the two-pilot multifunction display method 20 of an aircraft 11 comprises a step 21 of generating an FND page provided with predetermined symbols 5 and information 6 relating to the flight and to the navigation of the aircraft 11. Such an FND page is generated recursively by means of images displayed an indefinite number of times by applying rules, calculations and/or measurements corresponding, for example, to the position of the aircraft in relation to a reference frame such as the terrestrial reference frame. The FND page generated in this way changes in real time depending, for example, on parameters such as the altitude and the heading followed by the aircraft 11.

The method 20 then comprises displaying 22 this FND page on a priority screen 1 or 2 chosen from at least one of the screens 1, 2, 3. During this display operation 22, the FND page cannot be removed from the priority screen 1 or 2 by a first pilot and a second pilot.

A monitoring step 23 is then implemented by the detectors 7 described previously in order to detect whether the priority screen 1 or 2 is valid or has failed.

During the monitoring step 23, if the detectors 7 detect that the priority screen 1 or 2 has failed, the method 20 comprises an automatic reconfiguration step 24 implemented by the controller 8 in order to automatically display the FND page on a valid screen 1, 2, 3 without the first pilot and the second pilot having the possibility of removing the FND page from the valid screen 1, 2, 3. The controller 8 is therefore able to display the FND page on one of the screens 1, 2, 3 that remains valid while prohibiting the crew from subsequently deleting this newly displayed FND page.

Figures 4, 5:
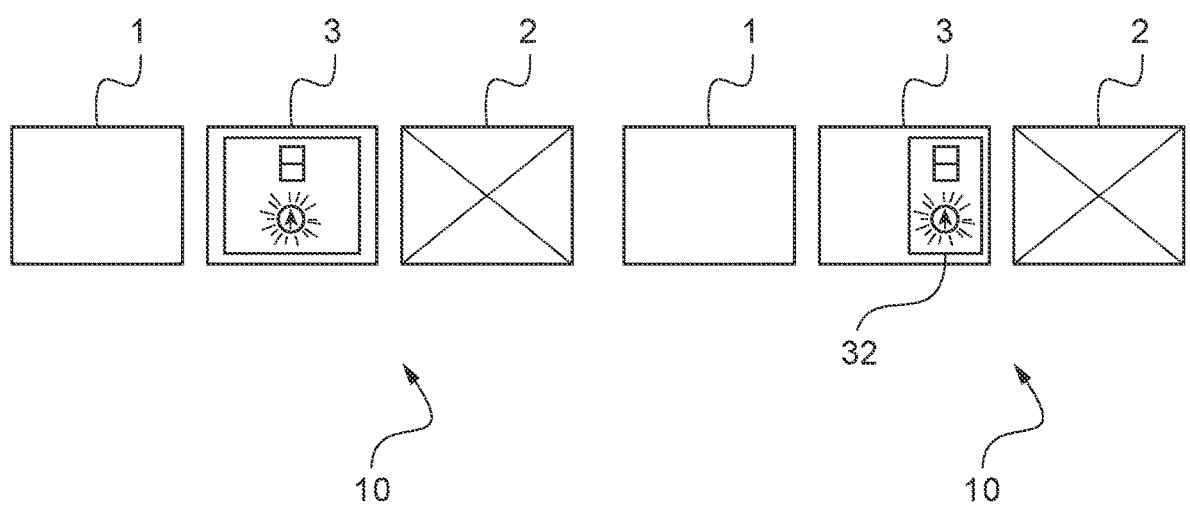
FIG. 4 is a diagram showing a first operating mode of display system, according to the disclosure.
FIG. 5 is a diagram showing a first embodiment of a second operating mode of the disclosure.

Moreover, as shown in FIGS. 4 and 5, the priority screen 1 or 2 may be the right-hand screen 2.

Figure 6:
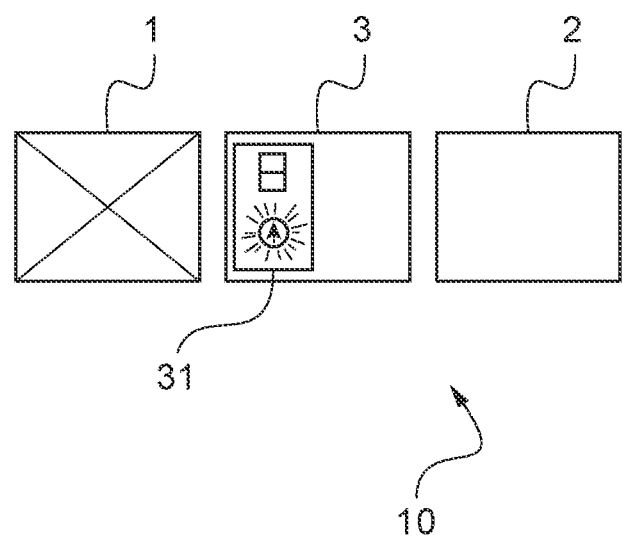
FIG. 6 is a diagram showing a second embodiment of the second operating mode of the disclosure.

Alternatively, as shown in FIG. 6, the priority screen 1 or 2 may be the left-hand screen 1.

Additionally, according to a first operating mode, the system 10 may be configured to display the FND page on the whole of the priority screen 2. Thus, as shown in FIG. 4, in the event of failure of this priority screen 2 detected by the detectors 7, the controller 8 is configured to display the FND page on the whole of the surface of the valid screen 3.

According to a second operating mode, the system 10 may be configured to display the FND page on a portion of the priority screen 1 or 2.

Therefore, according to a first example of this second operating mode shown in FIG. 5, in the event of failure of the priority screen 2 detected by the detectors 7, the controller 8 is configured to display the FND page on a right-hand part 32 of the surface of the valid screen 3.

According to a second example of this second operating mode shown in FIG. 6, in the event of failure of the priority screen 1 detected by the detectors 7, the controller 8 is configured to display the FND page on a left-hand part 31 of the surface of the valid screen 3.

The FND page, and other pages, may possibly be displayed on screens considered to be non-priority screens.

In this case, the FND page may be removed from these non-priority screens and, in the event of failure of one of these screens, the controller 8 may be configured to display this FND page on a valid screen with the crew having the possibility of removing it from the valid screen.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A two-pilot multifunction display system comprising:
   at least three screens, at least two of the at least three screens being suitable for displaying a page of symbologies referred to as the "FND page" comprising predetermined symbols and information relating to the flight and to the navigation of an aircraft; and
   detectors for detecting at least one failed screen among the at least three screens,
   wherein, except in the event of failure of at least one of the at least three screens, the FND page is displayed at least on a priority screen of the at least three screens without a first pilot and a second pilot having the possibility of removing the FND page, and wherein the display system comprises a controller configured so that, in the event of failure of the priority screen detected by the detectors, the FND page is automatically displayed on a valid screen of the at least three screens without the first pilot and the second pilot having the possibility of removing the FND page from the valid screen; and
   wherein, except in the event of failure of at least one of the at least three screens, the system is configured to display the FND page on a portion of the priority screen and, in the event of failure of the priority screen detected by the detectors, the controller is configured to display the FND page on part of the valid screen.

2. The system according to claim 1,
   wherein, the at least three screens comprising a right-hand screen arranged facing the first pilot, a left-hand screen arranged facing the second pilot and a central screen arranged between the first pilot and the second pilot, the first pilot and the second pilot being sat side by side in an aircraft cockpit, the priority screen is chosen from the group comprising the left-hand screen and the right-hand screen.

3. The system according to claim 2,
   wherein the priority screen is the right-hand screen.

4. The system according to claim 2,
   wherein the priority screen is the left-hand screen.

5. The system according to claim 1,
   wherein, the at least three screens comprising a right-hand screen arranged facing a first pilot, a left-hand screen arranged facing a second pilot and a central screen arranged between the first pilot and the second pilot, the first pilot and the second pilot being sat side by side in an aircraft cockpit, the priority screen being the right-hand screen, in the event of failure of the priority screen detected by the detectors, the controller is configured to display the FND page on a right-hand part of the valid screen.

6. The system according to claim 1,
   wherein, the at least three screens comprising a right-hand screen arranged facing a first pilot, a left-hand screen arranged facing a second pilot and a central screen arranged between the first pilot and the second pilot, the first pilot and the second pilot being sat side by side in an aircraft cockpit, the priority screen being the left-hand screen, in the event of failure of the priority screen detected by the detectors, the controller is configured to display the FND page on a left-hand part of the valid screen.

7. An aircraft comprising a cockpit suitable for receiving a first pilot and a second pilot sat side by side to either side of an anteroposterior plane of the aircraft,
   wherein the aircraft comprises the two-pilot multifunction display system according to claim 1.

8. A two-pilot multifunction display method of an aircraft comprising the steps of:
   generating a page of symbologies referred to as the "FND page" comprising predetermined symbols and information relating to the flight and to the navigation of the aircraft; and
   monitoring at least three screens in order to detect at least one failed screen among the at least three screens,
   wherein, except in the event of failure of at least one of the at least three screens, the method comprises displaying the FND page on a priority screen of the at least three screens without a first pilot and a second pilot having the possibility of removing the FND page, and wherein, in the event of failure of the priority screen detected during the monitoring process, the method comprises an automatic reconfiguration with a controller in order to automatically display the FND page on a valid screen of the at least three screens without the first pilot and the second pilot having the possibility of removing the FND page from the valid screen; and
   wherein, except in the event of failure of at least one of the at least three screens, the system is configured to display the FND page on a portion of the priority screen and, in the event of failure of the priority screen detected by the detectors, the controller is configured to display the FND page on part of the valid screen.

9. A two-pilot multifunction display system comprising:
   at least three screens, at least two of the at least three screens able to display a page of symbologies referred to as the "FND page" comprising predetermined symbols and information relating to the flight and to the navigation of an aircraft; and
   detectors able to detect at least one failed screen among the at least three screens,
   wherein, except in the event of failure of at least one of the at least three screens, the END page is displayed on a priority screen of the at least three screens without a first pilot and a second pilot having the possibility of removing the FND page, and wherein the display system comprises a controller configured so that, in the event of failure of the priority screen detected by the detectors, the END page is automatically displayed on a valid screen of the at least three screens without the first pilot and the second pilot having the possibility of removing the END page from the valid screen; and wherein, except in the event of failure of at least one of the at least three screens, the system is able to display the FND page on a portion of the priority screen and, in the event of failure of the priority screen detected by the detectors, the controller is able to display the END page on part of the valid screen.

10. The system according to claim 9, wherein, the at least three screens comprise a right-hand screen arranged facing a first pilot seat, a left-hand screen arranged facing a second pilot seat and a central screen arranged between the right-hand screen and the left-hand screen, the first pilot seat and the second pilot seat being side by side in an aircraft cockpit, the priority screen is chosen from the group comprising the left-hand screen and the right-hand screen.

11. The system according to claim 10,
wherein the priority screen is the right-hand screen.

12. The system according to claim 10,
wherein the priority screen is the left-hand screen.

13. The system according to claim 9, wherein, the at least three screens comprise a right-hand screen arranged facing a first pilot seat, a left-hand screen arranged facing a second pilot seat and a central screen arranged between the right-hand screen and the left-hand screen, the first pilot seat and the second pilot seat being side by side in an aircraft cockpit, the priority screen being the right-hand screen, in the event of failure of the priority screen detected by the detectors, the controller is configured to display the FND page on a right-hand part of the valid screen.

14. The system according to claim 9, wherein, the at least three screens comprise a right-hand screen arranged facing a first pilot seat, a left-hand screen arranged facing a second pilot seat and a central screen arranged between the first pilot seat and the second pilot seat, the first pilot seat and the second pilot seat being side by side in an aircraft cockpit, the priority screen being the left-hand screen, in the event of failure of the priority screen detected by the detectors, the controller is configured to display the FND page on a left-hand part of the valid screen.

* * * * *